United States Patent [19]

Hart

[11] Patent Number: 5,406,907

[45] Date of Patent: Apr. 18, 1995

[54] CONTROLLED PAN FEEDER SYSTEM FOR POULTRY

[75] Inventor: John F. Hart, Holland, Mich.

[73] Assignee: Big Dutchman Inc., Holland, Mich.

[21] Appl. No.: 157,902

[22] Filed: Nov. 24, 1993

[51] Int. Cl.$^6$ .......................................... A01K 39/012
[52] U.S. Cl. .................................... 119/53; 119/57.4; 119/903
[58] Field of Search ........................ 119/53, 57.4, 903

[56] References Cited

U.S. PATENT DOCUMENTS

| | | |
|---|---|---|
| 3,033,163 | 5/1962 | Hostetler et al. |
| 3,415,228 | 12/1968 | Myers. |
| 3,811,412 | 5/1974 | Murto et al. |
| 3,911,868 | 10/1975 | Brembeck. |
| 3,971,340 | 7/1976 | Allen. |
| 4,337,728 | 7/1982 | Van Gilst et al. ............... 119/57.4 |
| 4,401,057 | 8/1983 | Van Gilst ........................ 119/57.4 |
| 4,476,811 | 10/1984 | Swartzendruber. |
| 4,552,095 | 11/1985 | Segalla. |
| 4,815,417 | 3/1989 | Strong. |
| 4,995,343 | 2/1991 | Cole et al. |
| 5,007,380 | 4/1991 | Badia et al. |
| 5,092,274 | 3/1992 | Cole et al. |
| 5,097,797 | 3/1992 | Van Zee et al. |
| 5,101,765 | 4/1992 | Manfrin. |
| 5,101,766 | 4/1992 | Runion. |
| 5,113,797 | 5/1992 | Van Daele. |
| 5,311,839 | 5/1994 | Pollock et al. ................. 119/57.4 |

FOREIGN PATENT DOCUMENTS

| | | | |
|---|---|---|---|
| 1181482 | 11/1964 | Germany. | |
| 1757313 | 10/1981 | Germany | 119/57.4 |
| 1022509 | 6/1966 | United Kingdom | 119/57.4 |

Primary Examiner—Todd E. Manahan
Attorney, Agent, or Firm—Price, Heneveld, Cooper, DeWitt & Litton

[57] ABSTRACT

An animal pan feeder system, particularly for raising domestic birds and animals, and particularly for controlling the level of the feed in the pan, includes a pan assembly which has an adjustable skirt that determines the level of the feed, such skirt being adjustable by two structures. The first structure is an intermediate member between the drop tube and the skirt which is adjustable on the drop tube for adjusting the vertical position of the skirt. The second structure is the adjustment of a skirt by an anti-roost wire tied to the skirt by ties. The anti-roost wire is movable along the elongated feed conveyor, such movement asserts a pull on the ties which raises the skirt to adjust the level of the feed in the pan. Another feature of the invention is a cone-shaped deflector member mounted on the central axis of the drop tube for deflecting both the fines and coarse particles of the feed outwardly towards the outer periphery of the pan to eliminate the fines from accumulation in the central area of the pan. This deflector member is adjustable for shutting off the flow of feed through the drop tube.

15 Claims, 7 Drawing Sheets

CONTROLLED PAN FEEDER SYSTEM FOR POULTRY

This invention relates to pan feeder systems for animals, and more particularly relates to pan feeder systems for poultry and the like and also to a pan feeder assembly.

BACKGROUND OF THE INVENTION

Automated feeding systems for poultry and like domestic animals are extensively used, particularly for poultry such as chickens and turkeys. These systems supply feed mixtures to large poultry flocks. Such systems deliver regulated amounts and proportions of feed ingredients so as to permit the poultry to be raised from chicks to mature birds, that is, turkeys, breeders, and broilers.

One type of such feeder system provides for an elongated conveyor having spaced openings under each of which is mounted a feeder pan assembly. Each of these pan assemblies receive feed flowing through the conveyor. The entire system is generally suspended from the overhead structure of the poultry house.

In systems of the type above described, there have been various attempts to regulate the level of the feed in the pan for use at various stages of growth of the birds. Such regulation includes restricting the level of the feed in the pan by adjusting the position of a regulating member above the floor of the pan, that is, by raising or lowering it to establish the level of the feed in the pan. Sometimes, it is desirable to flood the pan and other times it is desirable to shut off the flow of the feed to selected pans. All types of mechanisms have been devised in an attempt to obtain such operating modes in a single pan assembly, that is, flooding the pan, restricting the level of the feed in the pan or shutting off the flow of feed to the pan. To my knowledge, no one has devised or developed a pan assembly that has been completely satisfactory, although there has been a long-felt need for such a pan assembly.

Another problem in the present day pan assemblies results from the feed constituency which comprises fine and coarse particles inherently produced in the preparation of the feed. In present day pan assemblies, the bottom of the pan has a centrally located cone provided for the purpose of causing the feed to be deflected outwardly to the outer periphery of the pan. However, coarse particles will generally deflect and migrate outwardly toward the outer periphery of the pan, but the fines tend to accumulate around the centrally located cone where they cake and may possibly mold to adversely effect the ntire feeding system. To my knowledge, no one has solved this problem.

In some prior art devices such as disclosed in U.S. Pat. No. 4,552,095, the regulating element for establishing the level of feed in the pan is adjusted by a cable operatively connected to a regulating member by means of ties secured to the cable and the regulating member. The cable is located underneath the feed conveyor and is operated from a central position by an actuator. Thus, the actuator can simultaneously adjust each of the regulating members for each pan assembly. In the same system, an electrified anti-roost cable is mounted above the conveyor to prevent the poultry from roosting on the conveyor. This system is costly because of the additional elements required and the support and installation required for the cable. It is proposed in the German Patent 1,181,482 issued on Nov. 12, 1964, to locate such a cable above the conveyor but in such disclosure, no electrified anti-roost wire is used. This has created the problem of requiring a costly adjustment means for the regulating member in the event an anti-roost wire is used or completely eliminating the anti-roost wire.

SUMMARY OF THE INVENTION

In accordance with my invention, I solve, or at least minimize, the problems set forth in the prior art pan feeding systems. I provide for several operating modes for regulating of the level of the feed in the pan by providing three members located under the opening of the elongated conveyor. The three members are a vertical feed drop tube having a passageway opening throughout its entire length for receiving and dispensing feed, an elongated intermediate member having a passageway opening extending its entire length, the opening at its upper end receiving the lower end of the drop tube and telescopicly adjustable over said drop tube. The third member is an elongated feed regulating skirt also having a passageway opening extending its entire length and surrounding at least a portion of and telescopicly movable in a vertical direction over the intermediate member. The skirt member and the intermediate member having inferlocking means whereby vertical adjustment of the intermediate member adjusts the vertical position of the skirt member relative to the pan. The skirt member determines the level of the feed in the pan since the feed piles up into the opening of the skirt member, upwardly into the intermediate member and into the drop tube from whence the feed cannot fall downwardly until the poultry eats some feed in the pan.

Another feature of my invention is to provide a means for lifting the skirt member which again adjusts the level of the feed in the pan. This can be done by adjusting the intermediate member on the drop tube or lifting the skirt member independently of the intermediate member and drop tube.

When the pan is to be flooded with feed, the skirt member is lifted substantially the entire way to the conveyor tube permitting the feed to drop down through the drop tube and fill the pan as will be described hereinafter.

In accordance with one aspect of my invention, the skirt member is lifted or raised by pulling and moving an anti-roost wire. The anti-roost wire is connected at one end of the tubular conveyor to an actuator that pulls the anti-roost wire to which is operatively connected to the skin member by ties. This feature solves that problem of having to provide a separate cable which is costly and also difficult to mount with respect to the pan because of the limited area in which a separate cable can be mounted while at the same time providing an anti-roost wire.

Another feature of my invention is the solving of the problem created by the fines of the feed accumulating in the center area of the pan while the larger coarse particles migrate outwardly to the periphery of the pan. My invention solves this problem by providing a specially designed cone supported in the center of the passageway of the intermediate member. This cone is rigidly mounted on the intermediate member with the peak of the cone extending in a direction toward the drop tube and located on the center axis of the drop tube so that as the feed is dropped downwardly through the tube from the tubular conveyor, the feed will be deflected radially outwardly in all directions causing both the fines and the coarse particles to land at or near the periphery of the pan. Within a narrow aspect of this invention, the walls of the cone-shaped feed deflector have symmetrical, concave, curvilinear surfaces causing the feed to slide down the walls and deflect it outwardly to the outer circumference of the pan.

It will become evident from the following description of my invention that it not only solves the problems previously existing in the art as described above, but also it provides a feed pan assembly that can be adjusted for regulating the level of feed in the pan such as for flooding, providing a restricted level, and shutting off the flow entirely.

The above and other features, advantages, and objects of the present invention will be further understood and appreciated by those skilled in the art by reference to the following specification, claims, and appended drawings.

Figure 1:
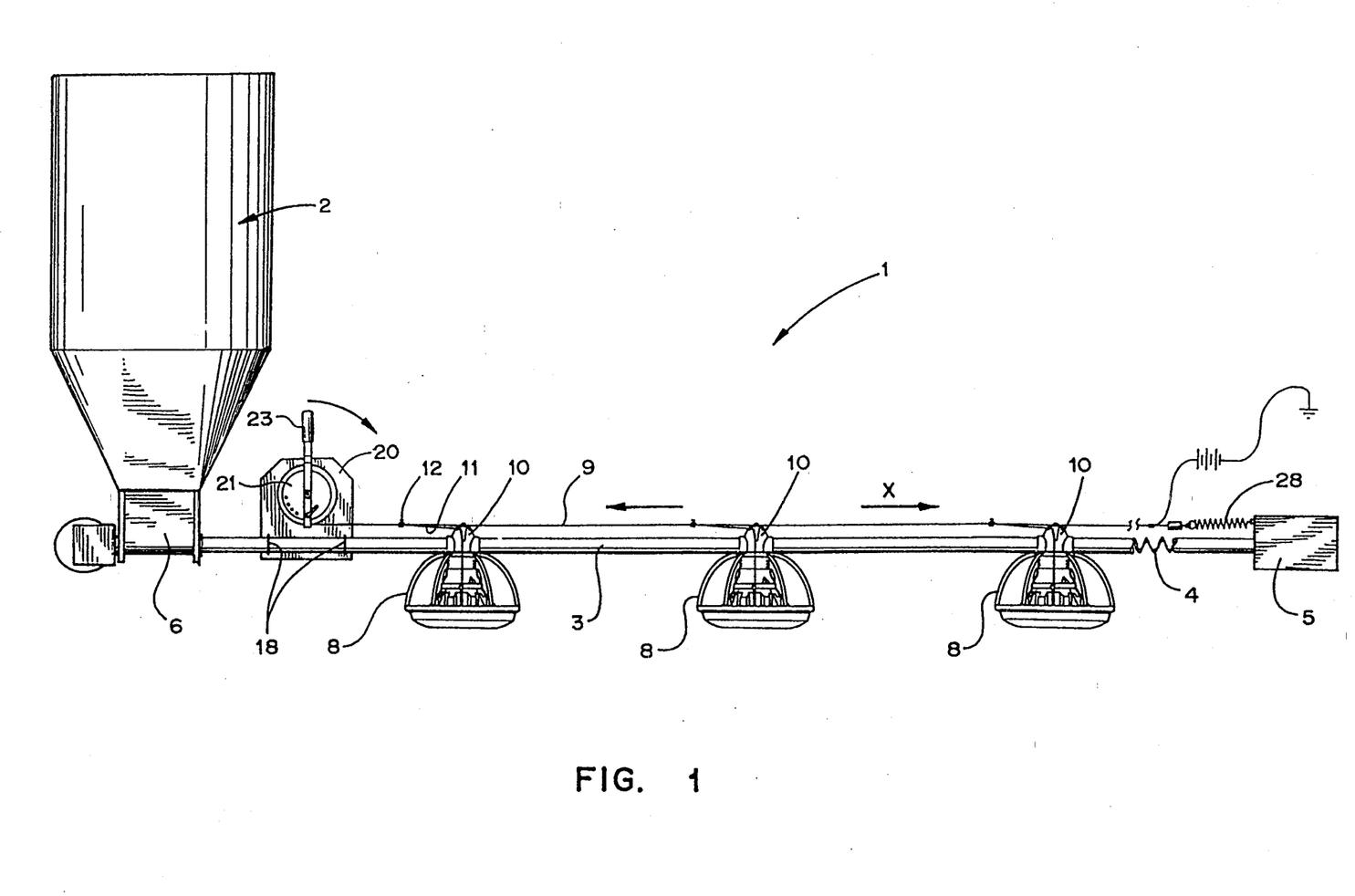
FIG. 1 is a side-elevational view of a pan feeder system of my invention.
Figures 2, 3:
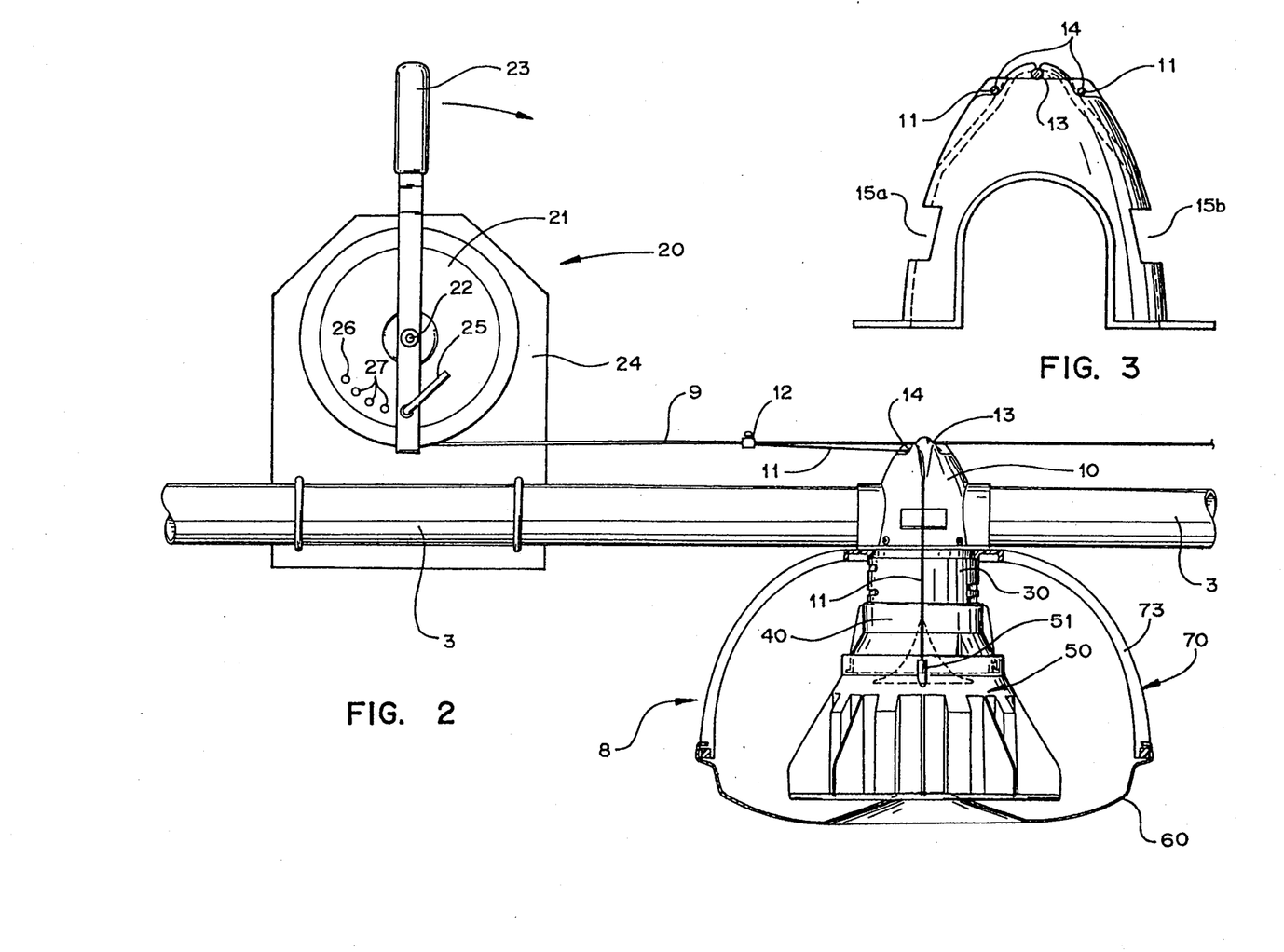
FIG. 2 is an enlarged side-elevational view of one of the pan assemblies and the actuator for lifting or raising the feed regulating skirt member.
FIG. 3 is an end view of a cap which is one of the components of my invention.

Referring to the drawings, FIG. 1 discloses the pan feeder system of this invention designated by reference numeral 1 including a feed hopper 2 and a conveyor tube 3 in which an auger 4 is driven by a notor 5. As is well known in the art, the auger 4 extends into the bottom housing 6 of the hopper 2 for pulling the feed through the tube 3. The tube 3 has a plurality of openings 7, such as disclosed in FIG. 4, spaced along the tube under which pan assemblies 8 are mounted for receiving feed conveyed through the tube 3 by the auger 4. Each of the pan assemblies 8 are mounted on the tube 3 by a cap 10 on which an electrified anti-roost wire 9 is slidably mounted for movement along the tube 3. The cap 10 is molded from plastic insulated material. Two ties 11 are attached to the anti-roost wire 9 by a clamp 12 at a place between the cap 10 and an actuator 20. The other ends of the ties 11 are attached to the regulating skirt member 50 at the element 51 (FIG. 2). The skirt 50, as will be described hereinafter, establishes the level of the feed in the pan 60.

One end of the anti-roost wire 9 is connected to a pulley 21 having a handle 23. Pulley 21 is pivotable about the axis 22 by a handle 23. Pulley 21 is pivotally mounted on the plate 24, which is rigidly attached to the tube 3 by the clamps 18. The pulley is constructed of insulated plastic so as to avoid short circuiting of the electrified anti-roost wire 9, it being understood that the cap 10 also is of an insulated material that will not short circuit the electrified anti-roost wire 9. The ties 11 are constructed of a plastic material for the same purpose. As disclosed in FIG. 5, the ties 11 extend through openings 71 in the top ring 74 of the grill 70 as will be described hereinafter. As disclosed in FIG. 3, the ties 11 extend through grooves 14 in the top crest of the caps 10. The anti-roost wire 9 also extends through openings 13 at the very top of the caps 10 so as to be captured thereby but at the same time being slidably movable within the openings 13.

Figure 8:
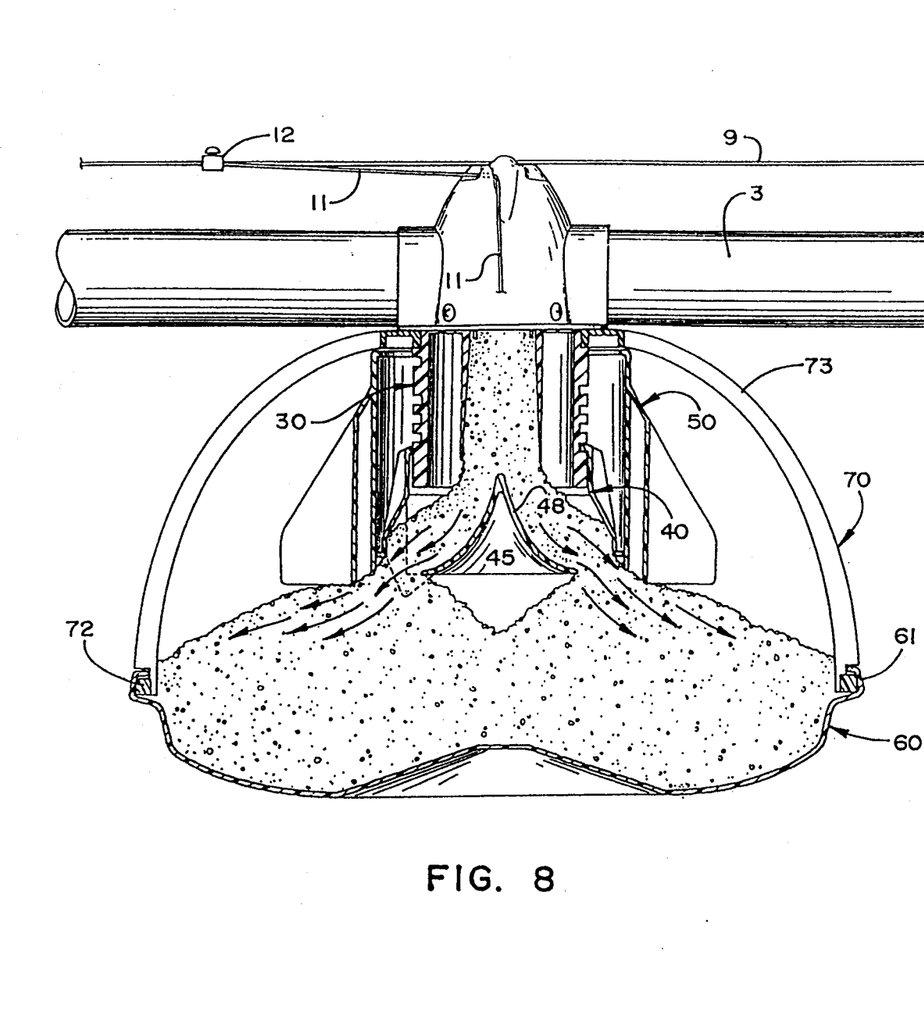
FIG. 8 is a side-elevational view of my pan assembly wherein the regulating skirt member is lifted or raised to a position permitting flooding of the pan with feed.

The actuator 20 is adapted to lift or raise the skirt 50 to the uppermost part of the grill 70 as disclosed in FIG. 8. At that position, the handle 23 is locked in place by the ke, 25 inserted through an opening in the lower end of the handle and the opening 26. The skirt 50 can be raised to any number of different positions determined by degree of rotation of the handle 23 in a clockwise direction. The handle can be locked in place by the key 25 being inserted into any one of the openings 27.

At the other end of the wire from the actuator 20, the wire is biased in the direction of the arrow X by the weight of the skirts 50 which can be assisted by the spring 28 depicted schematically on FIG. 1. It is important that if the spring is used, it must be insulated from the ground so as to avoid short circuiting the anti-roost wire 9.

Figure 4:
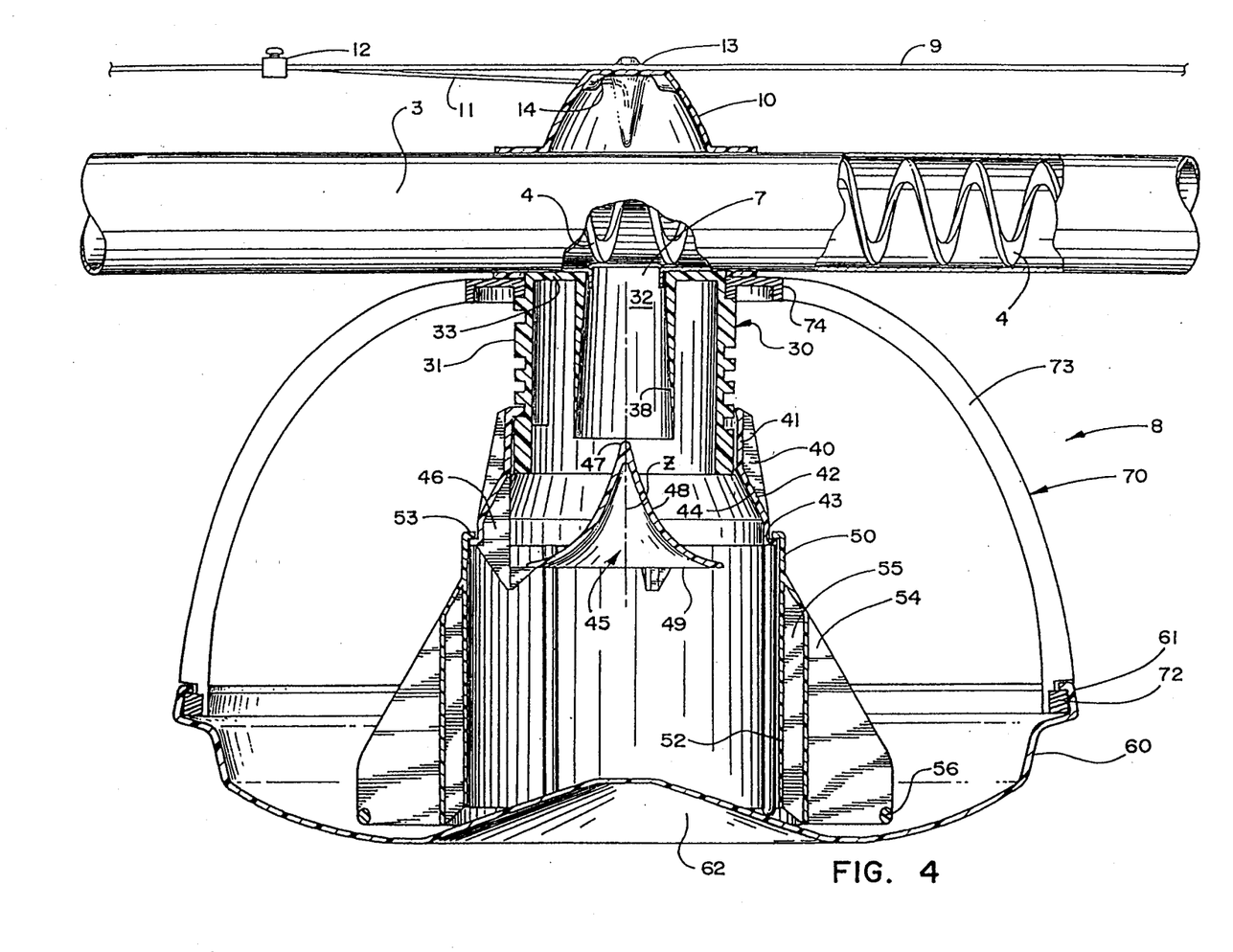
FIG. 4 is a side-elevational, cross-sectional view of one of my pan assemblies.
Figure 5:
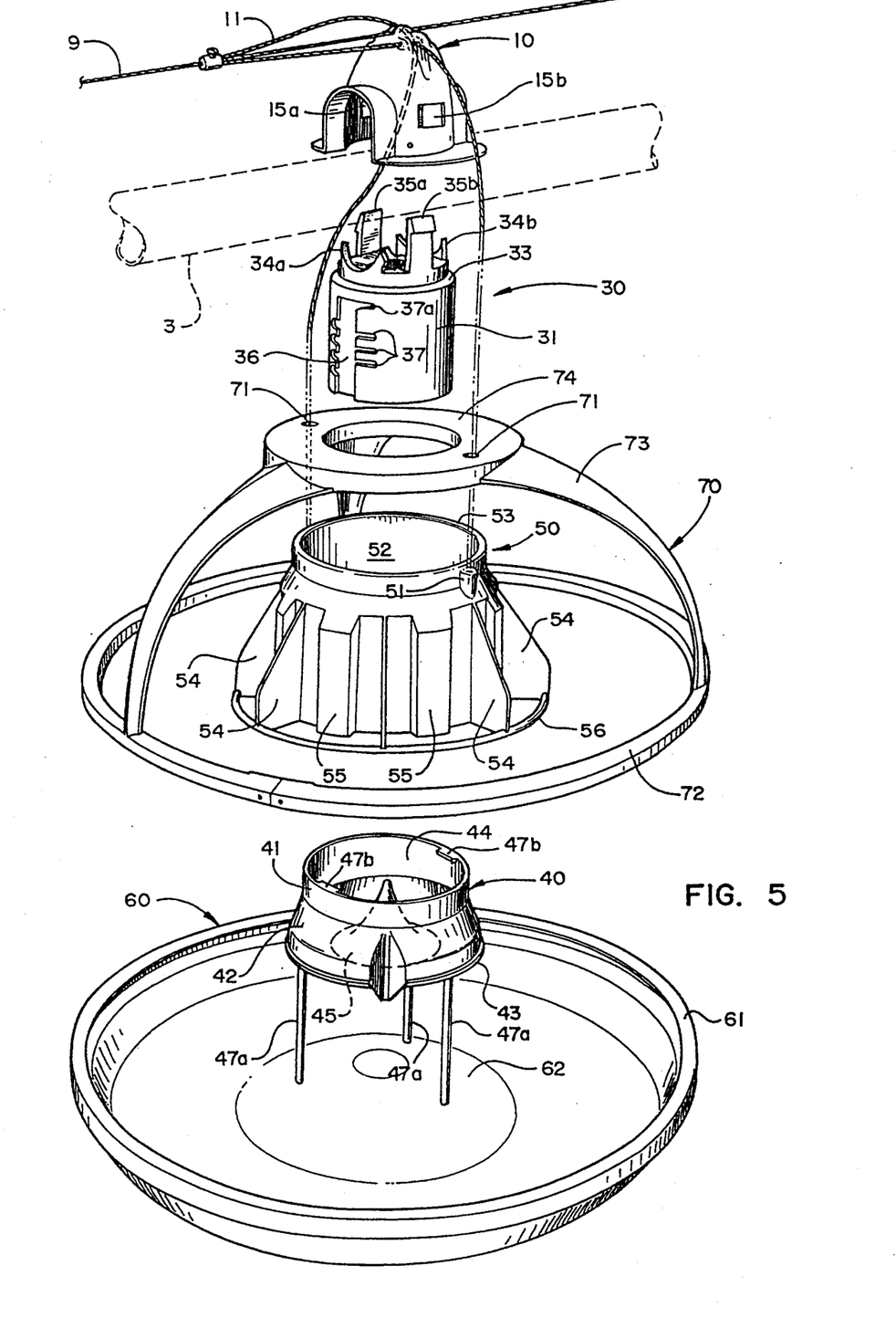
FIG. 5 is an exploded view of the major components of my invention.

Now referring to FIGS. 4 and 5, reference numeral 8 again designates the pan assembly which includes the cap 10, the drop tube 30, the intermediate member 40, the regulating skirt meanbet 50, the pan 60, and the grill 70. As disclosed, the drop tube is mounted on the conveyor tube 3 by the cap 10, the intermediate member 40 is mounted on the drop tube 30 and the regulating skirt member 50 is mounted on the intermediate member 40. The intermediate member 40 and the skirt member 50 are vertically, telescopicly adjustable as will be explained hereinafter.

Referring to FIGS. 4, 5, 10, and 11, the structures of drop tube 30, intermediate member 40, and regulating skirt member 50 will now be described. Drop tube 30 includes an outer cylinder 31 and inner cylinder 32 connected together by an upper wall 33. Extending upwardly from the upper wall are the saddle elements 34a and 34b. Also extending upwardly from the wall 33 are the retaining clip elements 35a and 35b which are sufficiently strong to support the pan assembly but sufficiently resilient to snap into the openings 15a and 15b of the cap 10 to connect the cap 10 and the drop tube 30 together around the circumference of the conveyor tube 3 (see FIG. 10) which supports the entire pan assembly on the conveyor tube 3.

The outer surface of the outer cylinder 31 includes vertical grooves 36 and horizontal grooves 37 on diametrically opposite sides of the cylinder which, in conjunction with the intermediate member 40, provides a means for adjustably supporting intermediate member 40 on the outer cylinder 31 at eight different adjustable vertical positions. In the supported position, the pan assembly 8 is supported with the passageway 38 of the inner cylinder 32 being aligned with the opening 7 in the conveyor tube 3 (FIG. 4). The intermediate member 40 is a quasicylindrical member having an upper reduced diameter portion 41 and a lower outwardly flared portion 42, the terminal end thereof including a flange 43. A passageway 44 extends the entire vertical length of the intermediate member. The inner wall of intermediate member 40 includes tabs 47b provided for extending into grooves 36 and 37 of the drop tube 30. Stilts 47a are attached to the bottom of the intermediate member 40 for establishing the lowennost vertical position of intermediate member 40.

Figure 9:
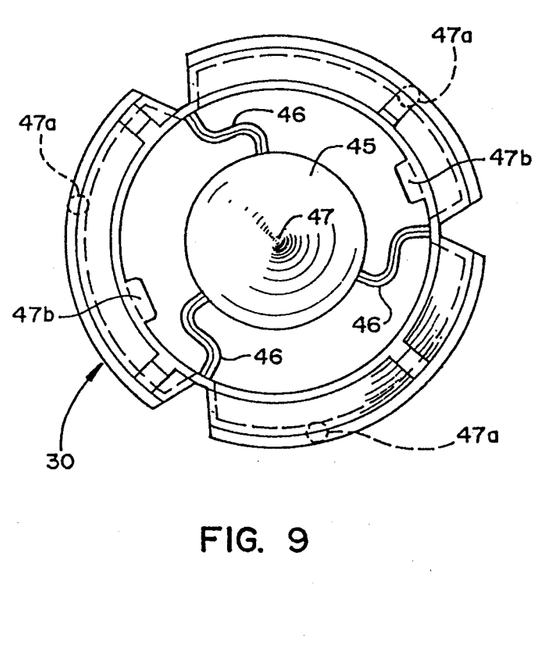
FIG. 9 is a top plan view of the intermediate member of my invention.
Figure 10:
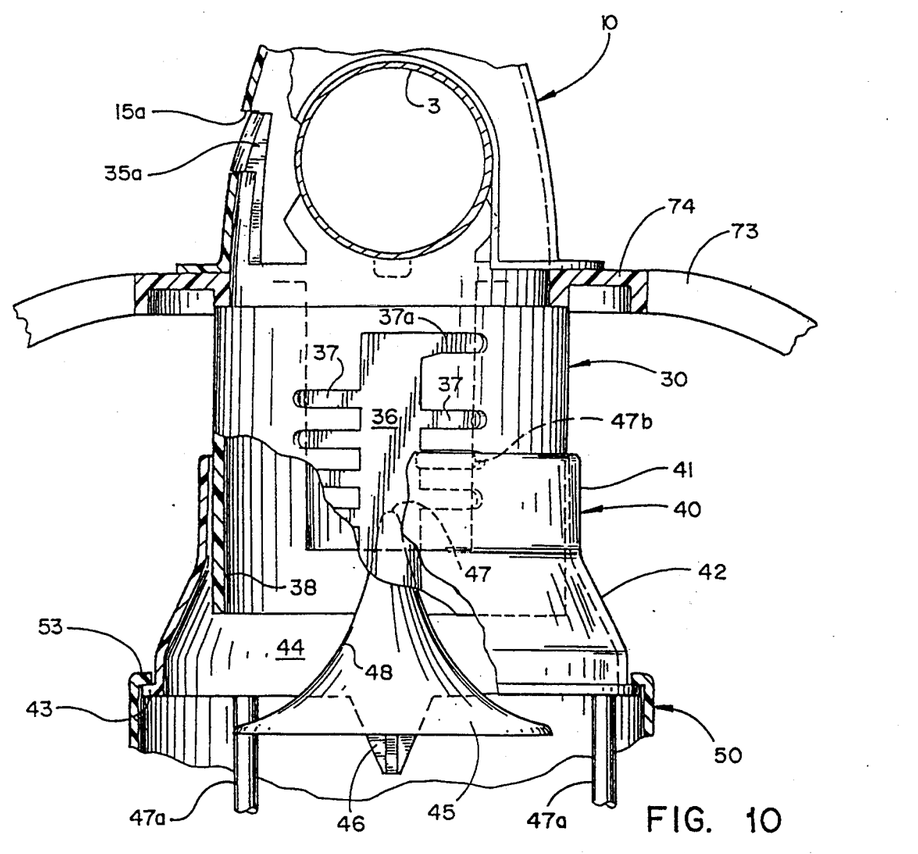
FIG. 10 is a side-elevational, partially cross-sectioned view of one position of the cone-shaped deflector as determined by the adjustable position of the intermediate member on the drop tube.
Figure 11:
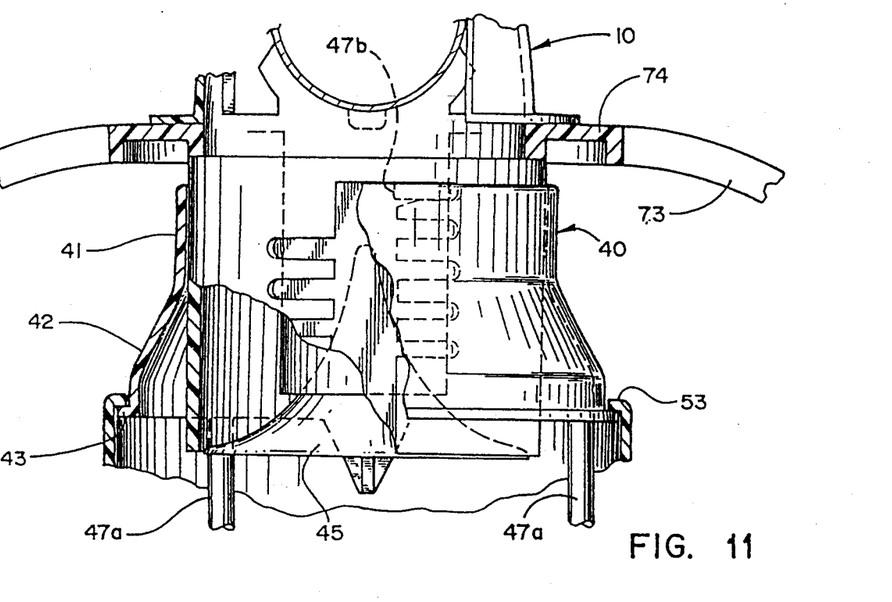
FIG. 11 is a side-elevational, partially sectioned view similar to FIG. 8 and disclosing another position of the cone-shaped deflector member completely shutting off the flow of feed through the drop tube.

A cone-shaped deflector member 45 is mounted centrally in the passageway 44 by three thin webs 46 attached to the inner wall of the flared portion 42 and to the deflector member 45 (FIG. 9). As will be discussed hereinafter, the peak 47 of the cone-shaped member 45 is located on the central axis Z of the drop tube 30 and the intermediate member 40 (FIG. 4) for the purpose of circumfluently distributing the feed in the outer peripheral portions of the pan 60.

The outer wall 48 of the cone-shaped deflector 45 has a concave, curvilinear shape extending from the peak or top 47 to the base 49. The shape of this surface, which is important, is chosen to provide for the feed to slide down the surface and be thrown outwardly to the outer circumference of the circular pan 60. The primary reason for this shape is that the fines as well as the more coarse particles will be thrown outwardly (see arrows in FIG. 8) thus preventing the accumulation of the fines in the central portion of the pan which on prior art pan feeder assemblies, occurs because the coarse particles tend to be deflected outwardly by the central cone-shaped section of the pan whereas the fines tend to gather, accumulate, and cake in the center of the pan.

Figure 6:
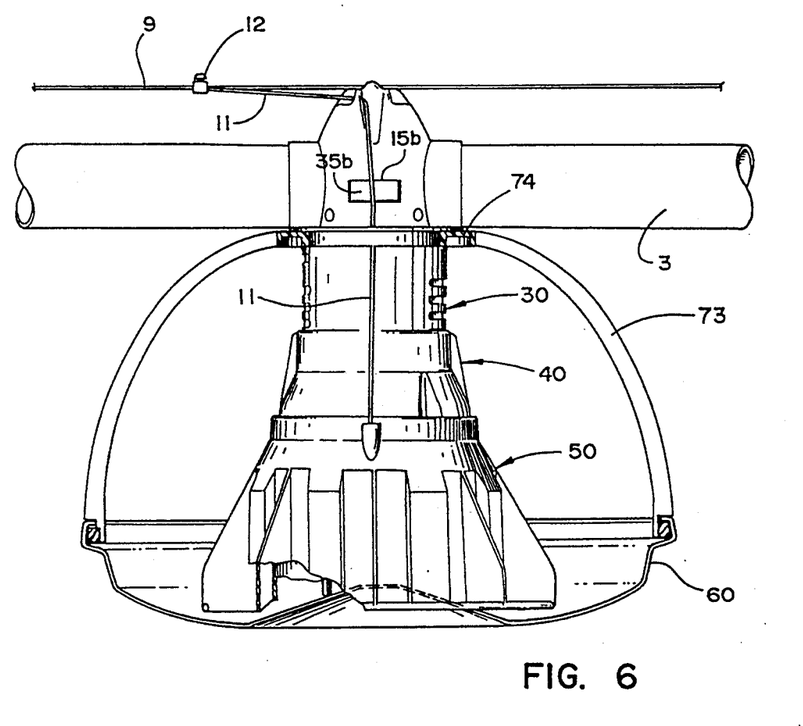
FIG. 6 is a side-elevational view showing one vertical position of the regulating skirt member as determined by one vertical adjustment of the intermediate member on the drop tube.
Figure 7:
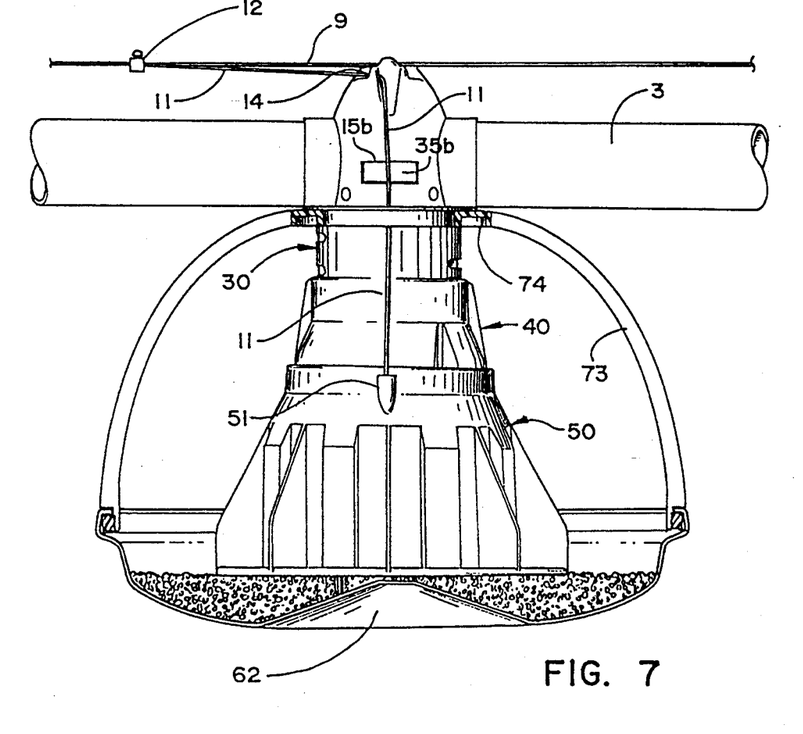
FIG. 7 is a side-elevational view of my pan assembly disclosing a second vertical position of the regulating skirt member as determined by a second adjusted position of the intermediate member on the drop tube.

The regulating skirt member 50 is a cylindrical member having a passageway 52 extending its entire vertical length. A flange 53 is provided at the very upper end of the cylinder for the purpose of engaging and interlocking with the flange 43 of the intermediate member (FIG. 4). This permits intermediate member 40, when adjusted upwardly on the drop tube 30, to adjust the skirt upwardly as illustrated by FIGS. 6 and 7. Skirt 50 establishes the level of the feed in pan 60 by reason of the feed accumulating in the skin 50, intermediate member 40, and the drop tube 30. The outer surface of the regulating skirt member 50 has a plurality of fins 54 and reinforcement ribs 55 extending radially outwardly. The lower portion of the fins terminate at a ring 56. This configuration of the outer surface of regulating skirt member 50 is to provide a sturdy skirt at the least amount of cost while at the same time defining the bird eating area within the pan 60. It should be evident from the drawings that the skirt member 50 is free to be lifted upwardly to the uppermost part of the drop tube 30 as disclosed in FIG. 8. As previously described, skirt member 50 has a pair of tie attaclunent elements 5 1 molded into the upper portion of the outer wall. The ties are connected to this element 51 and extend upwardly through the opening 71 of the grill 70 and through the openings 14 (FIG. 3) to the clamp 12 where they are attached to the anti-roost wire 9.

The pan 60 is of the type that is well known and conventional in the art. It is circular in shape and includes at its periphery a flange configuration 61 for receiving the ring 72 of the grill 70. The central portion 62 is cone-shaped to prevent the feed from accumulating in the central portion.

The grill 70 includes the rin$; 72 from which the supports 73 extend to a ring 74 which is captured between the upper wall 33 of the drop tube 30 for supporting the pan.

OPERATION

Having described all of the components of this invention and their interaction with respect to each other, the operation of the invention should be evident. Assuming hopper 2 contains feed which drops downwardly into the housing 6 and the anti-roost wire is assembled as disclosed in FIG. 1 so as to give a shock to any birds that might attempt to roost on the conveyor tube 3, the motor 5 is put in operation for rotating the auger 4. The feed is pulled from housing 6 through conveyor tube 3 by auger 4 from which it drops through the openings 7 into each of the passageways 38 of inner cylinders 32. With the intermediate member 40 adjusted upwardly to the position as disclosed in FIG. 7, the level of the feed is determined as shown by the position of the skirt 50. This level can be increased by adjusting intermediate member 40 upwardly which raises skirt 50. Such adjustment is accomplished by locating the tabs 47b in the vertical grooves 36 and telescopicly moving intermediate member 40 upwardly in alignment with the appropriate horizontal grooves 37. The drop tube 30 is then rotated to locate the tabs 47b in one of the horizontal grooves 37 establishing the vertical position of member 40 which also determines the vertical position of skirt 50 by reason of flange 43 of intermediate member 40 pulling upwardly on flange 53 of the skirt 50. In the position such as disclosed in FIG. 7 and other positions short of the flooding position disclosed in FIG. 8, the feed falling downwardly through the passageway 38 strikes the walls 48 of the cone-shaped deflector member 45 causing both the fines and coarser particles to be deflected or thrown outwardly against the irmer walls of the skirt 50. Thus, although the feed is not thrown out to the outer circumference of the pan 60, the fines are thrown radially outwardly from the center of the pan.

It should be evident that in addition to adjusting the vertical position of the skirt by means of vertically adjusting the intermediate member 40, the skirt can also be lifted upwardly by actuation of handle 23 to one of the positions as determined by the openings 26 and 27 (FIG. 2) as previously described. Thus, an almost innumerable adjustment of the vertical position of the skirt 50 and thus the level of the food in the pan can be obtained.

Quite frequently, it is desirable to flood the pan with feed as disclosed in FIG. 8. The position of the skirt 50 in FIG. 8 is entirely up against the ring 74 of the grill 70. In this position of skirt 50 and the lowermost position of intermediate member 40, as the feed falls downward through passageway 32 of inner cylinder 32, it is deflected by the wall 48 of the cone-shaped deflector member 45 to the outermost circumference of the pan 60 as illustrated by the arrows. Both the fine and the coarse particles of the feed are thrown radially outwardly thus eliminating the fines from accumulating and caking in the center of the pan 60.

The position of the skirt 50 is accomplished by rotating handle 23 of the actuator 20 to a position where the key 25 extends into the opening 26. As previously described, this is accomplished by the pulley 21 being rotated to pull on the anti-roost wire 9 as the handle 23 is rotated in a clockwise direction to align the key 25 with the opening 26. Thus, the anti-roost wire 9 serves a dual purpose of not only preventing birds from roosting on the conveyor tube 3, but also adjusting the position of the skirt 50 for the purpose of adjusting the level of the feed in the pan 60.

Another mode of operation is to completely shut off the flow of feed through the drop tube. This is accomplished by adjusting the intermediate member 40 to the uppermost position as determined by the horizontal slots 37a of the drop tube 30. This position is illustrated in FIG. 9.

Having described my invention, it should become evident that it has solved, or at least minimized, many of the problems of prior art pan feeding systems and pan assemblies. While I have described particular embodiments of the invention in detail, it will become obvious to those skilled in the art that changes and modifications in various aspects thereof may be made without departing from the spirit of the invention, such changes and modifications being matters of routine engineering or design which are obvious to one skilled in the art.

The embodiments of the invention in which an exclusive property or privilege is claimed are defined as follows:

1. The plurality of feeder pan assemblies in combination with an elongated feed conveyor means having an anti-roost wire extending along the top of said feed conveyor means, said assemblies each comprising:
   - a vertical feed drop tube having a passageway opening throughout its length and said opening at its upper end provided for receiving feed from said conveyor means and said opening at its lower end provided for dispensing feed;
   - means for supporting said drop tube relative to said feed conveyor for receiving feed into its upper end from said conveyor;
   - an elongated intermediate member having a passageway opening extending its entire length from its upper end to its lower end, said opening at its upper end receiving said drop tube and extending downwardly to surround at least a portion of and telescopicly adjustable over said drop tube:
   - an elongated feed regulating skirt member having a passageway opening extending its entire length from its Upper end to its lower end, said skirt member surrounding at least a portion of and telescopingly movable in a vertical direction over said intermediate member;
   - a pan mounted below said skirt member;
   - adjustable interlocking means on said intermediate member and drop tube for adjustably supporting said intermediate member on said drop tube in different vertical positions;
   - said skirt member and intermediate member having interlocking means whereby vertical adjustment of said intermediate member vertically adjusts the vertical position of the skirt member relative to said pan;
   - said skirt member being freely movable in an upward direction relative to said intermediate member;
   - said anti-roost wire being movable lengthwise along said elongated feed conveyor means;
   - actuator means connected to said anti-roost wire for moving said anti-roost wire along said elongated feed conveyor means; and
   - said means for lifting said skirt member including tie means attached to said anti-roost wire and said skirt member whereby when said anti-roost wire is moved by said actuator means, a pull is exerted on said tie means to raise said skirt member upwardly independent of said intermediate member.

2. The feeder pan assembly of claim 1 in which means is provided to limit the lowermost position of said intermediate member.

3. The feeder pan assembly of claim 2 n which the neans for limiting the lowermost position of the intermediate member includes stilts extending downwardly from said lower end for engaging said pan whereby a space is provided between said lower end of said intermediate member and said pan.

4. In a feeder system for animals comprising an elongated feed conveyor means having spaced openings for dropping feed into a plurality of spaced pan assemblies located under said openings; said pan assemblies each having an adjustable feed regulating element movable vertically between said pan and conveyor means for regulating the level of the feed in the pan; tie means connected to each of said regulating elements; and
   - actuator means operatively connected to said tie means for pulling and releasing said tie means to raise and lower said regulating elements; the improvement comprising:
   - said actuator means including an actuator and an electrified anti-roost wire extending along and above said elongated feed conveyor means and movable lengthwise along said elongated feed conveyor means by said actuator; said anti-roost wire preventing said animals and the like from roosting on the elongated feed conveyor; said ties being cormected to said anti-roost wire whereby when said anti-roost wire is moved by said actuator, a pulling force is exerted on the tie means causing the regulating elements to be raised whereby said anti-roost wire serves the dual function of raising and lowering said regulating elements to regulate the level of the feed in the pan and the prevention of animals from roosting over the elongated feed conveyor.

5. The feeder system of claim 4 in which said pan assemblies are suspended on said elongated conveyor means by a support member located above said conveyor means; said support member including openings for receiving and guiding said ties and anti-roost wire as they are pulled along said conveyor means by said actuator.

6. A method of adjusting the level of feed in a plurality of spaced feeder pans of a feeder system for animals, such pans each having an adjustable regulating element movable vertically between the pan and an elongated feed conveyor means located above said pan; said elongated feed conveyor means having an electrified anti-roost wire extending above and parallel to said elongated feed conveyor means, the improvement comprising:
   - adjusting the vertical position of said regulating element by interconnecting said anti-roost wire and regulating element with ties and moving said anti-roost wire lengthwise to raise or lower said regulating element to adjust the level of feed in said pan.

7. A feeder pan assembly for animals comprising:
   - a vertical feed drop tube having a passageway opening throughout its length and said opening at its upper end. provided for receiving feed and said opening at its lower end provided for dispensing feed;

means for supporting said drop tube relative to a feed conveyor for receiving feed into its upper end from said conveyor;

an elongated intermediate member having a passageway opening extending its entire length from its upper end to its lower end, said opening at its upper end receiving said drop tube and extending downwardly to surround at least a portion of and telescopicly adjustable over said drop tube;

an elongated feed regulating skiff member having a passageway opening extending its entire length from its upper end to its lower end said skirt member surrounding at least a portion of and telescopingly movable in a vertical direction over said intermediate member;

a pan mounted below said skirt member;

adjustable interlocking means on said intermediate member and drop tube for adjustably supporting said intermediate member on said drop tube in different vertical positions;

said skirt member and intermediate member having interlocking means whereby vertical adjustment of said intermediate member vertically adjusts the vertical position of the skirt member relative to said pan;

said intermediate member including a cone-shaped feed deflector rigidly mounted on said intermediate member centrally of said passageway opening of said intermediate member and spaced inwardly from the wall of said passageway opening, said cone-shaped deflector having downwardly and outwardly flared walls defining a peak at the uppermost part thereof slanted downwardly to a base, said peak located substantially on the central axis of said drop tube, the downwardly and outwardly flared walls being shaped to cause feed dropped through said drop tube to slide down said walls and be deflected to the outer circumference of said pan.

8. A feeder pan assembly for animals comprising:

a vertical feed drop tube having a psageway opening throughout its length and said opening at its upper end provided for receiving feed and said opening at its lower end provided for dispensing feed;

means for supporting said drop tube relative to a feed conveyor for receiving feed into its upper end from said conveyor;

an elongated intermediate member having a passageway opening extending its entire length from its upper end to its lower end, said opening at its upper end receiving said drop tube and extending downwardly to surround at least a portion of and telescopicly adjustable over said drop tube;

an elongated feed regulating skirt member having a passageway opening extending its entire length from its upper end to its lower end, said skirt member surrounding at least a portion of and telescopingly movable in a vertical direction over said intermediate member;

a pan mounted below said skirt member;.

adjustable interlocking means on said intermediate member and drop tube for adjustably supporting said intermediate member on said drop tube in different vertical positions;

said skirt member and intermediate member having interlocking means whereby vertical adjustment of said intermediate member vertically adjusts the vertical position of the skirt member relative to said pan;

said intermediate member including a cone-shaped feed deflector rigidly mounted on said intermediate member centrally of said passageway opening of said intermediate member and spaced inwardly from the wall of said passageway opening, said cone-shaped deflector having downwardIV and outwardly flared walls defining a peak at the uppermost part thereof slanted downwardly to a. base, said peak located substantially on the central axis of said drop tube; and the cross-section of the exterior of said walls of said cone-shaped feed deflector taken through any vertical plane extending through said peak defining two symmetrical, concave, curvilinear surfaces.

9. A feeder pan assembly for animals comprising:

a vertical feed drop tube having an opening throughout its length, said opening at its upper end provided for receiving feed, said opening at its lower end provided for dispensing feed;

means for supporting said drop tube relative to a feed conveyor for receiving feed into its upper end from said conveyor;

a pan located below said drop tube for receiving feed dropped through said drop tube;

a cone-shaped deflector member having downwardly and outwardly flared walls defining a peak at the top thereof;

said walls being shaped to cause feed dropped through said drop tube to slide down said walls and be deflected to the outer circumference of said pan; and support means for said cone-shaped deflector member for supporting said deflector member below said drop tube and above said pan, said support means maintaining said peak substantially on the central axis of said drop tube regardless of the vertical position of said deflector member relative to said drop tube.

10. A feeder pan assembly for animals comprising:

a vertical feed drop tube having an opening throughout its length, said opening at its upper end provided for receiving feed, said opening at its lower end provided for dispensing feed;

means for supporting said drop tube relative to a feed conveyor for receiving. feed into its upper end from said conveyor;

a pan located below said drop tube for receiving feed dropped through said drop tube;

a cone-shaped deflector member having downwardly and outwardly flared walls defining a peak at the top thereof;

the cross-section of the exterior of said walls of said cone-shaped feed deflector taken through any vertical plane extending through said peak defining two symmetrical, concave, curvilinear surfaces; and support means for said cone-shaped deflector member for supporting said deflector member below said drop tube and above said pan, said support means maintaining said peak substantially on the central axis of said drop tube regardless of the vertical position of said deflector member relative to said drop tube.

11. A feeder pan assembly for animals and the like comprising;

a vertical feed drop tube having an opening throughout its length, said opening at its upper end provided for receiving feed, said opening at its lower end provided for dispensing feed;

means for supporting said drop tube relative to a feed conveyor for receiving feed into its upper end from said conveyor;

a pan located below said drop tube for receiving feed dropped through said drop tube;

a cone-shaped deflector member having downwardly and outwardly flared walls defining a peak at the top thereof;

support means for said cone-shaped deflector member for supporting said deflector member below said drop tube and above said pan, said support means maintaining said peak substantially on the central axis of said drop tube regardless of the vertical position of said deflector member relative to said drop tube;

said cone-shaped deflector member being mounted centrally in a passageway opening extending entirely through an elongated support member, said deflector member being supported by relatively thin support elements secured to the deflector and the inner walls of said opening of said elongated support member, said passageway opening of said elongated support member receiving the lower end of said drop tube; and means for adjustably supporting said elongated support member on said drop tube for adjustment to a number of vertical positions whereby the vertical position of said deflector member relative to said drop tube can be adjusted.

12. The feeder pan assembly of claim 11 in which the means for adjustably supporting said elongated support menber provides for adjustment of said elongated support member to a vertical position wherein said cone-shaped deflector closes the lower end of the drop tube opening to shut off the flow of feed therethrough.

13. The feeder pan assembly of claim 11 in which an elongated feed regulating skirt having a passageway opening extending its entire length is mounted over the lower end of said elongated support member;

said opening of said skirt member being sufficiently large to permit said skirt member to be freely movable vertically upwardly over said elongated support member and said drop tube;

tie means attached to said skirt member and adapted to be operatively attached to an actuator means for pulling and releasing said tie means to raise and lower said skin member; and the vertical adjustment of said elongated support means on said drop tube and the raising and lowering adjustments of said skirt means relative to said elongated support means and drop tube permitting multiple levels of feed in said pan.

14. The feeder pan assembly of claim 13 in which the cone-shaped deflector member has walls defining symmetrical, concave, curvilinear surfaces.

15. The feeder pan assembly of claim 14 in which said surfaces reflect the feed outwardly against the walls of said passageway opening of said skirt when the skirt is in a downward position and when said skirt is raised, said surfaces reflect the feed outwardly to substantially the perimeter of said pan.

* * * * *

UNITED STATES PATENT AND TRADEMARK OFFICE
CERTIFICATE OF CORRECTION

PATENT NO. : 5,406,907
DATED     : April 18, 1995
INVENTOR(S) : John F. Hart

It is certified that error appears in the above-indentified patent and that said Letters Patent is hereby corrected as shown below:

Title page, item [57],

In the Abstract, line 3;
   "pan," should be --pan. The system--.

In the Abstract, line 6;
   "structure" should be --feature--.

In the Abstract, line 9;
   "structure" should be --feature--.

In the Abstract, line 14;
   "Another" should be --A third--.

In the Abstract, line 14;
   After "feature" delete --of the invention--.

Column 1, line 53;
   "ntire" should be --entire--.

Column 2, line 26;
   "inferlocking" should be --interlocking--.

Column 2, line 50;
   "skin" should be --skirt--.

Column 3, line 56;
   "notor" should be --motor--.

Column 4, line 26;
   "ke," should be --key--.

UNITED STATES PATENT AND TRADEMARK OFFICE
CERTIFICATE OF CORRECTION

PATENT NO. : 5,406,907
DATED : April 18, 1995
INVENTOR(S) : John F. Hart

It is certified that error appears in the above-indentified patent and that said Letters Patent is hereby corrected as shown below:

Column 4, line 42;
　　　"meanbet" should be --member--.

Column 5, line 14;
　　　"lowennost" should be --lowermost--.

Column 5, line 48;
　　　"skin" should be --skirt--.

Column 5, line 60;
　　　"attaclunent" should be --attachment--.

Column 5, line 60;
　　　"5 1" should be --51--.

Column 6, line 4;
　　　"rin$;" should be --ring--.

Column 6, line 40;
　　　"irmer" should be --inner--.

Column 7, line 43;
　　　"tube:" should be --tube;--.

Column 8, line 8;
　　　"2 n" should be 2 in--.

Column 8, line 33;
　　　"cormected" should be --connected--.

UNITED STATES PATENT AND TRADEMARK OFFICE
CERTIFICATE OF CORRECTION

PATENT NO. : 5,406,907
DATED : April 18, 1995
INVENTOR(S) : John F. Hart

It is certified that error appears in the above-indentified patent and that said Letters Patent is hereby corrected as shown below:

Column 8, line 66;
    "end. provided" should be --end provided--.

Column 9, line 10;
    "skiff" should be --skirt--.

Column 9, line 12;
    "end said" should be --end, said--.

Column 9, line 40;
    "psageway" should be --passageway--.

Column 10, line 6;
    "downwardIV" should be --downwardly--.

Column 10, line 8;
    "a." should be --a--.

Column 10, line 46;
    "receiving." should be receiving--.

Column 10, line 66;
    "comprising;" should be --comprising:--.

Column 12, line 3;
    "menber" should be --member--.

Column 12, line 18;
    "skin" should be --skirt--.

UNITED STATES PATENT AND TRADEMARK OFFICE
CERTIFICATE OF CORRECTION

PATENT NO. : 5,406,907
DATED : April 18, 1995
INVENTOR(S) : John F. Hart

It is certified that error appears in the above-indentified patent and that said Letters Patent is hereby corrected as shown below:

Abstract, line 3;
   "pan. includes" should be --pan. The system includes--.

Abstract, line 6;
   "structure" should be --feature--.

Abstract, line 9;
   "structure" should be --feature--.

Abstract, line 14;
   "Another feature of the invention is" should be --A third feature is--.

Signed and Sealed this

Twenty-fourth Day of October, 1995

Attest:

BRUCE LEHMAN

*Attesting Officer*     *Commissioner of Patents and Trademarks*